Jan. 20, 1925.　　　　　　　　　　　　　　　1,523,586
J. A. CURTIN

WEIGHING MECHANISM FOR CARDING MACHINES

Filed Feb. 23, 1923

Inventor:
James A. Curtin
By Owen W. Kennedy
attorney

Patented Jan. 20, 1925.

1,523,586

UNITED STATES PATENT OFFICE.

JAMES A. CURTIN, OF WORCESTER, MASSACHUSETTS.

WEIGHING MECHANISM FOR CARDING MACHINES.

Application filed February 23, 1923. Serial No. 620,684.

*To all whom it may concern:*

Be it known that I, JAMES A. CURTIN, a citizen of the United States, residing at Worcester, in the county of Worcester and Commonwealth of Massachusetts, have invented a certain new and useful Improvement in a Weighing Mechanism for Carding Machines, of which the following, together with the accompanying drawings, is a specification.

My invention relates to feeding and weighing devices that are adapted to automatically weigh material which is to be carded before delivering the material to a carding machine. The object of my invention is to provide an improved mechanism that is adapted to be applied to a feeding and weighing device, whereby the operation of the latter is rendered more effective, and the accuracy with which the successive charges of material are weighed is greatly increased.

It is a well known fact that the feeding and weighing devices for carding machines heretofore constructed cannot be absolutely depended upon to always deliver successive charges of material to the carding machine, each of exactly the same weight. The difference in weight in the charges is largely due to the fact that the movement of the hopper weighing arm is not always effective to cause immediate stoppage of the feeding apron, and while the variations in weight between different charges may be very slight, yet a considerable amount of material will be wasted each day in a mill using a number of weighing devices which are not strictly accurate. By the present invention I provide an improved mechanism for transmitting the movement of the hopper weighing arm so that the weight of material for successive charges can be closely adjusted and always will remain the same for a given adjustment. The above and other advantageous features of my invention will hereinafter more fully appear, reference being had to the accompanying drawings in which, Fig. 1 is a view in side elevation of a portion of a feeding and weighing machine embodying my invention.

Figure 1:
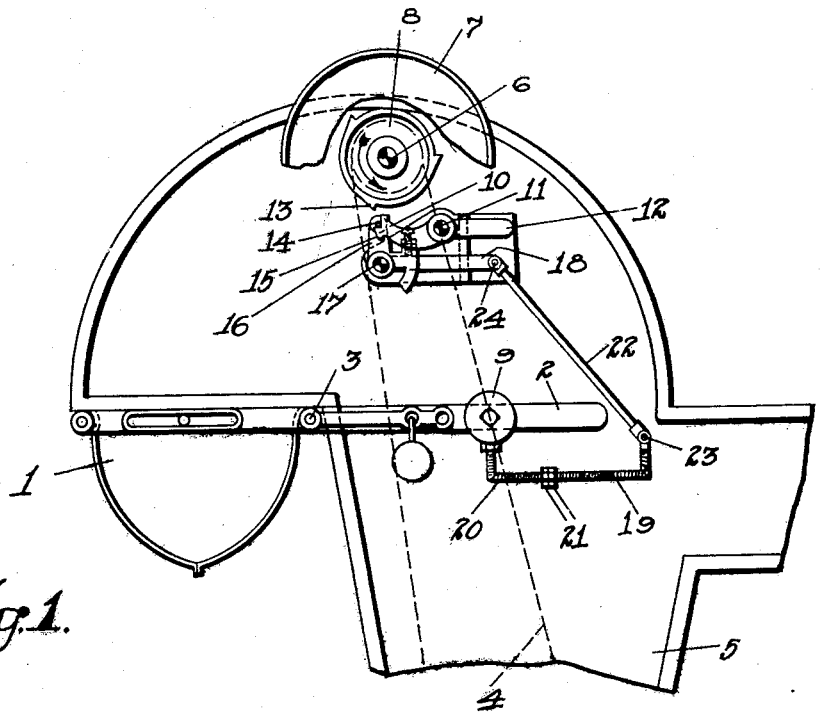
Figure 2:
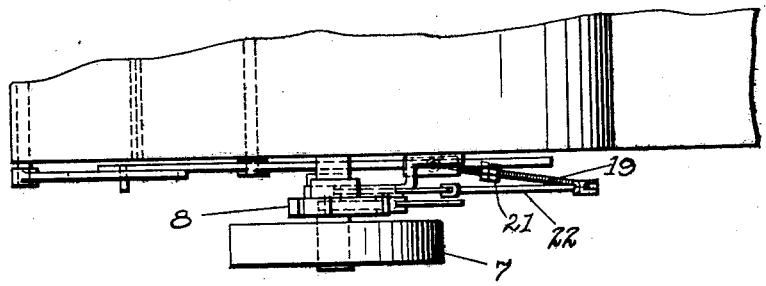

Fig. 2 is a plan view of the parts shown in Fig. 1.

Like reference characters refer to like parts in the different figures.

Referring to Fig. 1, there is shown a portion of a feeding and weighing machine of a well known type which comprises a hopper 1 supported by a weighing arm 2 pivotally mounted at 3. Material which is to be carded is adapted to be delivered to the hopper 1 by means of an apron 4 extending downwardly into a box or bin 5, only a portion of which is shown.

The apron 4 is driven from a shaft 6 which is adapted to be connected to a driving pulley 7, through a clutch 8. When the shaft 6 is driven from the pulley 7, the apron 4 is adapted to convey material to the hopper 1, and when a predetermined amount of material has accumulated in the hopper, the latter is adapted to move downwardly, thereby moving the weight arm 2 upwardly. In order to vary the amount of material which must accumulate in the hopper 1 before moving the weight arm 2, a weight 9 is slidably mounted on the arm 2, and in all previous weighing machines with which I am familiar, the weight 9, or additional weights similarly mounted on the arm 2, have constituted the only means for adjusting the machine.

The clutch 8 connecting the apron shaft 6 to the pulley 7 is adapted to be actuated to disconnect the shaft 6 by means of a dog 10, pivoted at 11, and provided with a weighted portion 12 which tends to move the dog 10 into the path of movement of a number of stops 13 mounted on a rotating member of the clutch 8. The dog 10 is adapted to be held out of engagement with the stops 13 by means of a pin 14 engaging a shoulder 15 provided on the dog 10. The pin 14 is carried on an arm 16, pivoted at 17, and a second arm 18 is provided for moving the arm 16. In weighing machines as previously constructed, the arm 18 has been connected directly to the weighing arm 2 at a point between the weight 9 and its pivot 3, whereby movement of the weighing arm 2 by the hopper 1 is adapted to turn the arm 16 to release the dog 10 from the pin 14. When this occurs one of the stops 13 engages the dog 10 and thereby unclutches the apron shaft 6 from the pulley 7, which operation prevents further material from being fed into the hopper. As previously stated however, it has been found that successive charges delivered to the carding machine by the hopper are often of different weight, and this has been largely due to the fact that the movement of the weighing arm 2 is of such small amplitude that it is not usually sufficient to disengage the pin 14 from the dog 10 as soon as the hopper 1 starts to move downwardly. In order to overcome this sluggish action of the clutch operating means, I have provided improved mechanism for amplifying the movement of the weighing arm 2 and at the same time for obtaining a more delicate operation of the weighing arm, which mechanism will now be described.

A rod 19 is secured to the weight 9 by any suitable means, and is provided with screw threads 20, with which nuts 21 are adapted to coact for the purpose of adjusting the position of the nuts 21 with respect to the pivot 3 of the weighing arm 2. The rod 19 extends beyond the end of the weighing arm 2, and its outer end is pivotally connected to a link 22 by means of a pin 23. The link 22 is in turn connected to the arm 18 by a pin 24. With this arrangement of parts, it is apparent that a very slight movement of the weighing hopper 1 will result in a very greatly multiplied movement of the pin 23 at the end of the rod 19, which movement is transmitted to the arm 18 through the link 22. Consequently the pin 14 is adapted to release the dog 10 as soon as the hopper 1 moves even very slightly, thereby interrupting the movement of the apron 4 to prevent further feeding of material into the hopper 1. The fact that the dog 10 is disengaged almost simultaneously with the movement of the hopper 1, insures that successive charges delivered by the hopper will all be of the same weight. When it is desired to vary the weight of a given charge, the weight can be very delicately adjusted by means of the nuts 21 without making it necessary to move the relatively heavy weight 9 on the arm 2.

From the foregoing it is apparent then that by my invention I have provided an improved mechanism for weighing and feeding machines of the class described, by means of which the machine is caused to deliver charges of material all of the same weight. In addition, my invention provides improved means for obtaining very close adjustment of the amount of material entering into a given charge. While I have shown my invention as applied to a particular arrangement of the parts of a weighing machine, it is not so limited and is capable of various modifications within the scope of the appended claims.

I claim:

1. In a device of the class described, the combination with a hopper, a pivoted weighing arm carrying said hopper, an apron driving mechanism and a controlling member therefor, of a counterweight carried by said arm, and a member extending therefrom to which is connected said controlling member for the apron driving mechanism.

2. In a device of the class described, the combination with a hopper, a pivoted weighing arm carrying said hopper, an apron driving mechanism and a controlling member therefor, of a counterweight carried by said arm, and a rod extending therefrom to a point beyond the end of said arm to which is connected said controlling member for the apron driving mechanism.

3. In a device of the class described, the combination with a hopper, a pivoted weighing arm carrying said hopper, an apron, a source of power and a clutch for connecting said apron to said source of power, of a counterweight carried by said arm, a rod extending therefrom to a point beyond the end of said arm, and a member connected to said rod for operating said clutch.

4. In a device of the class described, the combination with a hopper, a pivoted weighing arm carrying said hopper, an apron, a source of power and a clutch for connecting said apron to said source of power, of a counterweight carried by said arm, a rod extending therefrom to which is connected a member for operating said clutch, and a weight adjustable on said rod.

JAMES A. CURTIN.